(12) United States Patent
Yan

(10) Patent No.: US 8,082,490 B2
(45) Date of Patent: Dec. 20, 2011

(54) INPUT IN ENTERPRISE SOFTWARE APPLICATIONS

(75) Inventor: Nancy Yan, Santa Clara, CA (US)

(73) Assignee: SAP AG, Walldorf (DE)

( * ) Notice: Subject to any disclaimer, the term of this patent is extended or adjusted under 35 U.S.C. 154(b) by 954 days.

(21) Appl. No.: 11/238,718

(22) Filed: Sep. 29, 2005

(65) Prior Publication Data
US 2007/0074100 A1    Mar. 29, 2007

(51) Int. Cl.
G06N 3/00    (2006.01)

(52) U.S. Cl. .......................................... 715/224

(58) Field of Classification Search .............. 715/234, 715/243, 254, 224
See application file for complete search history.

(56) References Cited

U.S. PATENT DOCUMENTS

| | | | | |
|---|---|---|---|---|
| 2002/0156792 A1* | 10/2002 | Gombocz et al. | .......... | 707/100 |
| 2002/0184401 A1* | 12/2002 | Kadel et al. | .......... | 709/315 |
| 2003/0043187 A1* | 3/2003 | Li | .......... | 345/749 |
| 2004/0044635 A1* | 3/2004 | Gordon et al. | .......... | 706/50 |
| 2005/0182792 A1* | 8/2005 | Israel et al. | .......... | 707/104.1 |
| 2006/0005127 A1* | 1/2006 | Ferguson et al. | .......... | 715/522 |

OTHER PUBLICATIONS

Raggett et al. "HTML 4.01 Specification: 17 Forms," Dec. 24, 1999, available from: <http://www.w3.org/TR/interact/forms.html>.*
Toh, "Required field(s) validation," Jan. 16, 2003, available from: <http://www.dynamicdrive.com/dynamicindex16/requiredcheck.htm>.*
Castro, "HTML for the World Wide Web: 5th Edition," 2003, Peachpit Press, pp. 269-292.*

* cited by examiner

*Primary Examiner* — Kyle Stork
(74) *Attorney, Agent, or Firm* — Buckley, Maschoff & Talwalkar LLC

(57) ABSTRACT

Methods and apparatus, including computer program products, for user input in enterprise software application. A method includes displaying a view on a display device, the view including an input field, and enabling a framework that describes properties and services for each business attribute that is bound to the input field, the framework comprising a list of metadata descriptors for the input field.

20 Claims, 4 Drawing Sheets

INPUT IN ENTERPRISE SOFTWARE APPLICATIONS

BACKGROUND

The present invention relates to data processing by digital computer, and more particularly to input in enterprise software applications.

An input field is one of the most commonly used user interface (UI) controls in form-based software applications, such as enterprise business applications. A UI input field typically includes a field label and an input box. In enterprise software applications, an input field can be bound to an attribute in a business object. In addition, functional icons or buttons are usually attached in close relation to an input field in order to launch, for example, search help or additional applications in support of facilitating data population to the input field.

Typically, when building new enterprise software applications, there is a need for flexible customizable solutions for handling input fields to support form-based enterprise software applications. A need exists for a solution that allows input fields in form-based enterprise software applications to keep up with changing business requirements. In different object contexts, given authorization and user interaction scenarios, there is often a need, for example, of altering field labels, hiding certain fields, marking mandatory fields, rendering value helps automatically, attaching functional buttons based on an application at run time, and so forth.

Manually building up business services and property services for each input field can be a time-intensive activity. It is desirable to have an overall synergism where all of the services of input fields can be enabled to exhibit behavior based properties defined for business attributes. This exhibited behavior needs to allow forms to invoke business services without requiring time and labor intensive software coding.

SUMMARY

The present invention provides methods and apparatus, including computer program products, for input in enterprise software applications.

In general, in one aspect, the invention features a computer-implemented method including displaying a view on a display device, the view including an input field, and enabling a framework that describes properties and services for each business attribute that can be bound to the input field, the framework including a list of metadata descriptors for each business attribute that binds to the input field.

In embodiments, the metadata descriptors can be selected from the group including field name, maximum length of field, number of decimal places, value help, data type in dictionary, field label, domain name, search help name, currency, unit, linked field, can be icon, field type, external object link name, business service name, service component name, visible, required, read only and enabled.

The framework can include a client tier to render context-field labels, indicate business state, rearrange fields, display services buttons to launch helper applications, and control write permissions.

The framework can be a plug-in. The framework can be a layer between business logic and a presentation layer.

The input field can include field properties and field services. The field properties can be selected from the group including read-only or editable, enabled or disabled, visible or hidden, and optional or mandatory. The field services can be selected from the group including defined and configured on demand.

The method can include passing data from custom services to an application field using the framework. Passing can include a proxy, and a model view controller (MVC).

The invention can be implemented to realize one or more of the following advantages.

The method provides a generic framework that defines an input field with both field properties and field services. Field properties are used to control presentation of an input field dynamically. Field services are used to attach functional icons or buttons next to an input field in order to launch help or additional applications as a helper in the support of facilitating data population to the input field.

The method enables synergy between input fields and a business logic layer of an enterprise software application. This method provides a structure to describe properties and services for each business attribute that is bound to an input field.

Using definitions of metadata descriptors for each business attribute, methods include a client tier to render a context-driven field label, indicate business state, rearrange fields, display services buttons to launch helper applications and control write permissions.

The method facilitates code reuse and provides end-to-end solutions that are abstractions of a business framework.

The method can be used by any enterprise.

The method can be written in any language, such as Java®, C, C++, and so forth.

The framework has a proxy as a placeholder to persist data retrieved from custom services temporarily, and then pass to the receiving application. A Model View Controller (MVC) design ensures data passing between controllers without a need to refresh the view.

One implementation of the invention provides all of the above advantages.

Other features and advantages of the invention are apparent from the following description, and from the claims.

BRIEF DESCRIPTION OF THE DRAWINGS

FIG. 4 is an exemplary implementation diagram.
Like reference numbers and designations in the various drawings indicate like

DETAILED DESCRIPTION

Figure 1:
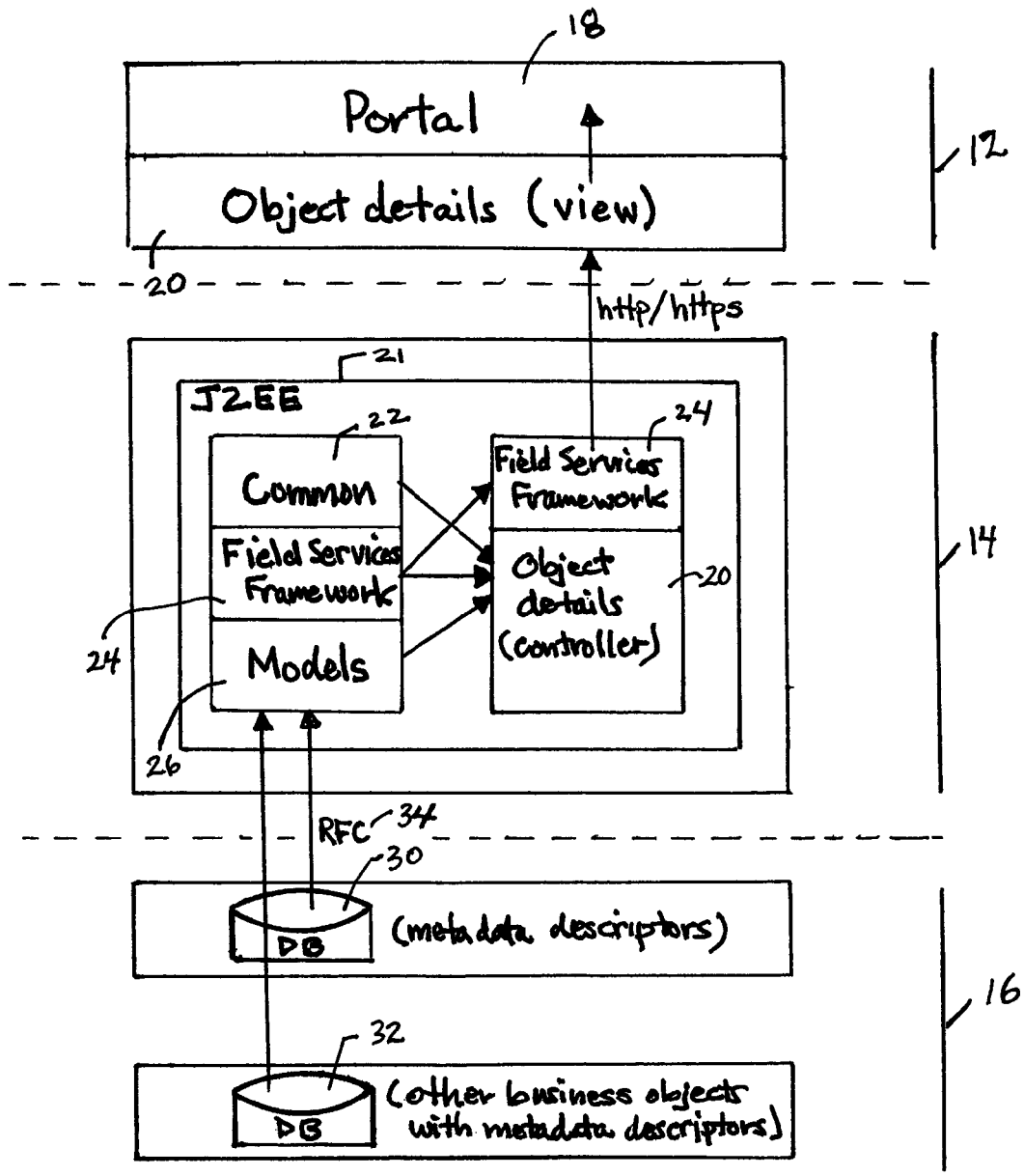
FIG. 1 is a block diagram.

As shown in FIG. 1, an exemplary distributed multi-tiered architecture 10 includes a presentation layer 12, a business logic layer 14 and a persistence layer 16. Client components run on the presentation layer 12, web-tier and business-tier components run on the business logic layer 14 and enterprise information software runs on the persistence layer 16.

The presentation layer 12 includes a portal 18 and object details 20 jointly referred to as a user interface layer). In one specific example, the portal 18 is a digital dashboard that creates a centralized point for various business applications and provides a summary of information pertaining to those business applications, just as a car's dashboard provides centralized access to summarized information about various aspects of the car's critical details. Object details 20 represent a business application that is exposed in the portal 18 and uses a field services framework (described below) of the business logic layer 14.

The business logic layer 14 includes a J2EE engine 21 having a common component 22, a field services framework 24 and a models component 26, which provide services and data to an object details component 28. The field services framework 24 communicates with the object details 20 of the presentation layer 12 using, for example, Hypertext Transfer Protocol (HTTP) or Hypertext Transfer Protocol over Secure Socket Layer (HTTPS).

The persistence layer 16 includes a database 30 of metadata descriptors and a database 32 of other business objects with metadata descriptors. The databases 30, 32 communicate with the models component 26 of the J2EE engine 21 using, for example, remote function calls (RFCs).

The object details (view) 20 of the presentation layer 12 can display one or more input fields based on the attributes predefined and customized for the object. As described above, an input field includes a field label and an input box. In enterprise applications, an input field is typically bound with an attribute in a business object. In addition, functional icons or buttons are typically attached next to the input field in order to, for example, launch search help or an additional application in support of facilitating data population to the input field.

The architecture 10 uses the field services framework 24 to enable a generic framework that defines an input field with both properties and services. Field properties are used to control presentation of an input field dynamically. Four pairs of properties are associated with an input field, i.e., (1) read-only or editable, (2) enabled or disabled, (3) visible or hidden, and (4) optional or mandatory. Field services are used to attach functional icons or buttons next to an input field in order to launch help or additional applications as a helper in the support of facilitating data population to the input field. Field services can be defined and configured on demand, e.g., Search Help, Customer Lookup or Item Selector.

Figure 2:
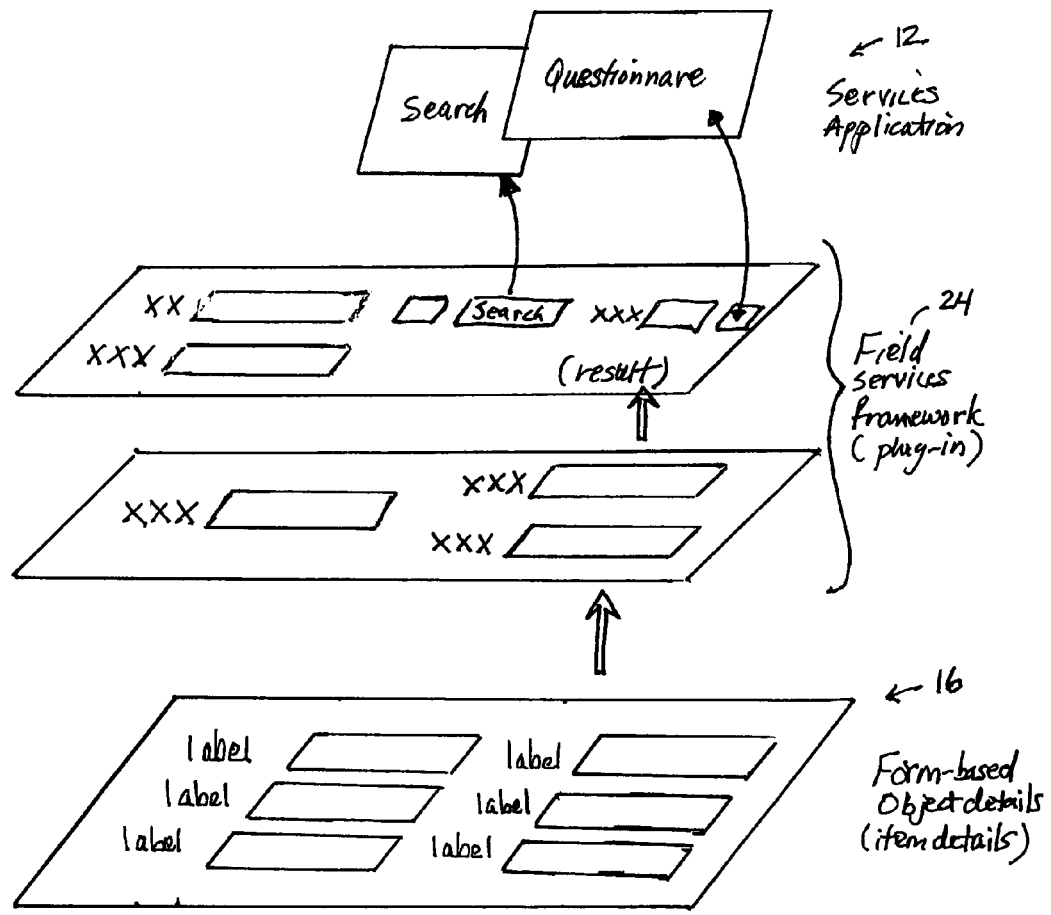
FIG. 2 is a block diagram.

As shown in FIG. 2, the field services framework 24 can be a plug-in that interfaces between the persistence layer 16 and the presentation layer 12. The field services framework 24 enables dynamic input field modifications at runtime, dynamic action and event handler generation for service buttons and icons, realignment of inserted buttons next to the appropriate input field, and rearrangement of proper field layout.

The field services framework 24 enables a synergy between input fields and a business logic layer of an enterprise software application. The framework 24 provides a structure to describe properties and services for each business attribute that is bound to an input field. The structure includes a list of metadata descriptors for each business field. The metadata descriptors can include field name, maximum length of field, number of decimal places, value help (true or false), is icon (true or false), field type (e.g., technical field, business field or custom field), external link object name, business service name, service component name, visible (true or false), required (true or false), read-only (true or false), enabled (true or false), and so forth.

Using definitions of metadata descriptors for each business attribute, the field services framework 24 renders a context-driven field label, indicates business state, rearranges fields, displays services buttons to launch helper applications and control write permissions. The framework 24 is a layer between business logic and a presentation layer; it can be easily plugged into any form-based enterprise software application at runtime.

Figure 3:
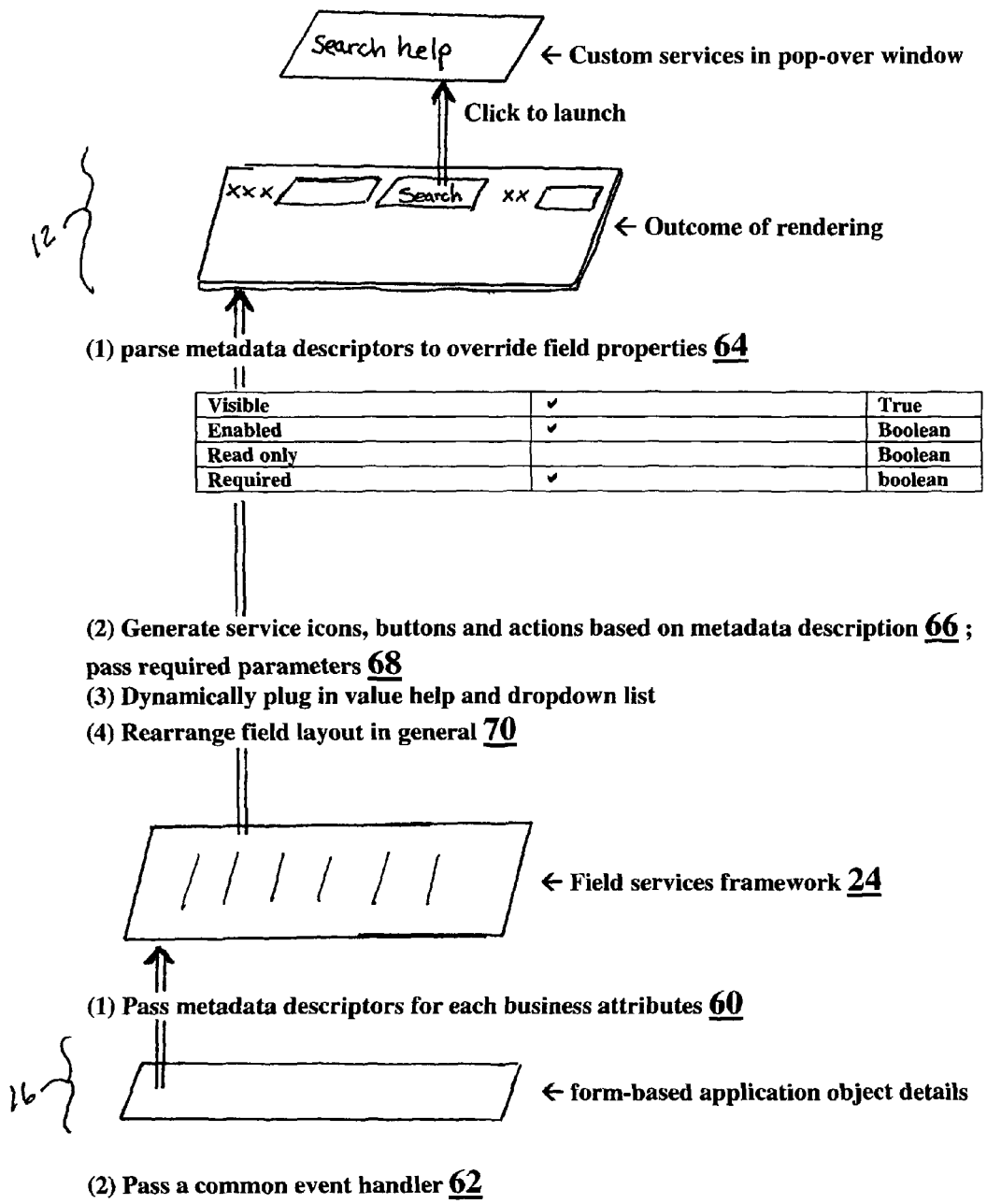
FIG. 3 is a block diagram.

As shown in FIG. 3, the persistence layer 16 includes form-based object details. Form-based object details, with their associated attributes, are created at design time, and provide a layout configuration for each input field. The persistence layer 16 passes metadata descriptors 60 for each business attribute and a common event handler 62 to the field services framework 24. The field services framework 24 operates in run time and enables an outcome of rendering on the presentation layer 12. The field services framework 24 reads the configuration information (i.e., metadata) for each input field. The field services framework 24 parses 64 metadata descriptors to override field properties. The field services framework 24 generates 66 service icons, buttons and actions, based on the metadata descriptors, and passes 68 required parameters. The field services framework 24 rearranges 70 the input field layout.

Figure 4:
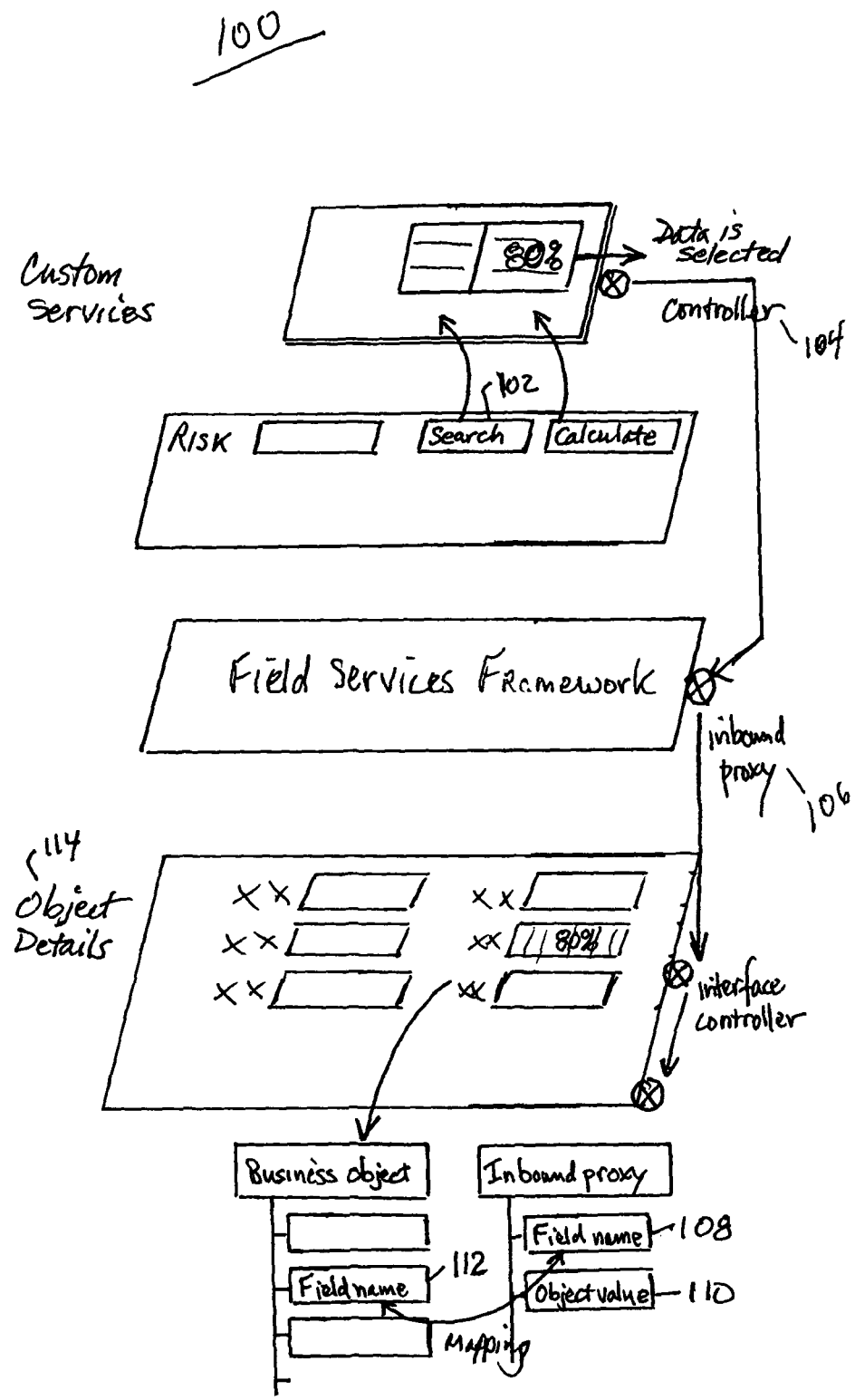

As shown in FIG. 4, an exemplary implementation 100 illustrates one particular example of how data is passed back from a customer services field to an application field using the field services framework 24. In this example, a calculation 102 is activated with respect to a risk, e.g., clicking on a calculate button. A new popup window prompts and renders a calculation application. Once the user performs a risk calculation, the value of the risk 80% is passed to the calculation application controller 104. Since the controller 104 is mapped to the field services framework 24, which maps to an inbound proxy 106 having a placeholder including a field name 108 and a field value 110. In this example, the field name 108 is risk and the field value 110 is 80%. The Field name 108 is the technical object attribute name. It is used as a key in data passing and mapping. Field name 108 is mapped to field name 112 and the object details 114 for this business object and populated into the placeholder.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A computer-implemented method comprising:
    displaying a view on a display device, the view comprising an input field, the input field including field properties and field services, the field properties including a plurality of pairs, the plurality of pairs including read-only and editable, enabled and disabled, visible and hidden, and optional and mandatory;
    enabling a framework that describes properties and services for each business attribute that is bound to the input field, the framework comprising a list of metadata descriptors for each business attribute that binds to the input field;
    parsing, via the framework, the metadata descriptors to override field properties; and
    generating an icon or a button based upon the metadata descriptors;
    using the field services of the input field to attach the icon or the button next to the input field in order to launch a helper application in support of facilitating data population to the input field;
    after the icon or the button has been activated, displaying a window that prompts and renders the helper application;
    passing a value to a controller for the helper application, wherein the controller for the helper application is mapped to the framework that describes the properties and services for each business attribute bound to the input field next to which is attached the icon or the button to launch the helper application, wherein the framework is mapped to an inbound proxy having a placeholder that includes a field name and a field value, and wherein the field name of the inbound proxy mapped to the framework is mapped to a field name for a business object and to object details for the business object; and
    populating the field value of the placeholder and a field of the object details for the business object with the value passed to the controller for the helper application.

2. The computer-implemented method of claim 1 wherein the metadata descriptors are selected from the group consisting of field name, maximum length of field, number of decimal places, value help, and data type in dictionary.

3. The computer-implemented method of claim 2 wherein the framework further comprises a client tier to render context-field labels, indicate business state, rearrange fields, display services buttons to launch helper applications, and control write permissions.

4. The computer-implemented method of claim 1 wherein the framework is a plug-in.

5. The computer-implemented method of claim 1 wherein the framework is a layer between business logic of an enterprise system and a presentation layer.

6. The computer-implemented method of claim 1 wherein the field services are selected from the group consisting of defined and configured on demand.

7. The computer-implemented method of claim 1 further comprising: passing data from custom services to an application field using the framework.

8. The computer-implemented method of claim 7 wherein passing comprises: a proxy; and a model view controller (MVC) driven application environment.

9. The computer-implemented method of claim 1 wherein the metadata descriptors further include external object link name, business service name, service component name, visible, required, read only and enabled.

10. The computer-implemented method of claim 1 wherein the metadata descriptors are stored in a database communicating with a models component using remote function calls.

11. A computer program product, tangibly embodied in an information carrier, for user input in enterprise software applications, the computer program product being operable to cause data processing apparatus to:
    display a view on a display device, the view comprising an input field, the input field including field properties and field services, the field properties including a plurality of pairs, the plurality of pairs including read-only and editable, enabled and disabled, visible and hidden, and optional and mandatory;
    enable a framework that describes properties and services for each business attribute that is bound to the input field, the framework comprising a list of metadata descriptors for the input field;
    parse, via the framework, the metadata descriptors to override field properties;
    generate an icon or a button based upon the metadata descriptors;
    use the field services of the input field to attach the icon or the button next to the input field in order to launch a helper application in support of facilitating data population to the input field;
    after the icon or the button has been activated, display a window that prompts and renders the helper application;
    pass a value to a controller for the helper application, wherein the controller for the helper application is mapped to the framework that describes the properties and services for each business attribute bound to the input field next to which is attached the icon or the button to launch the helper application, wherein the framework is mapped to an inbound proxy having a placeholder that includes a field name and a field value, and wherein the field name of the inbound proxy mapped to the framework is mapped to a field name for a business object and to object details for the business object; and
    populate the field value of the placeholder and a field of the object details for the business object with the value passed to the controller for the helper application.

12. The computer program product of claim 11 wherein the metadata descriptors are selected from the group consisting of field name, maximum length of field, number of decimal places, value help, and data type in dictionary.

13. The computer program product of claim 12 wherein the framework further comprises a client tier to render context-field labels, indicate business state, rearrange fields, display services buttons to launch helper applications, and control write permissions.

14. The computer program product of claim 11 wherein the framework is a plug-in.

15. The computer program product of claim 11 wherein the framework is a layer between business logic of an enterprise system and a presentation layer.

16. The computer program product of claim 11 wherein the field services are selected from the group consisting of defined and configured on demand.

17. The computer program product of claim 11 further comprising: pass data from custom services to an application field using the framework.

18. The computer program product of claim 17 wherein passing comprises: a proxy; and a model view controller driven application environment.

19. The computer program product of claim 11 wherein the metadata descriptors further include external object link name, business service name, service component name, visible, required, read only and enabled.

20. The computer program product of claim 11 wherein the metadata descriptors are stored in a database communicating with a models component using remote function calls.

* * * * *